United States Patent
Bishop

[15] 3,646,556
[45] Feb. 29, 1972

[54] REFLECTED IFF INTERROGATION REJECTOR

[72] Inventor: Walton B. Bishop, Oxon Hill, Md.

[73] Assignee: The United States of America as represented by the Secretary of the Navy

[22] Filed: Mar. 25, 1970

[21] Appl. No.: 22,467

[52] U.S. Cl. ........................................343/6.5 R, 343/114.5
[51] Int. Cl. ..............................................................G01s 9/56
[58] Field of Search ......................................343/6.5, 114.5

[56] References Cited

UNITED STATES PATENTS 3,349,402  10/1967  Foster ...........................343/6.5 R X

*Primary Examiner*—T. H. Tubbesing
*Attorney*—R. S. Sciascia, Arthur L. Branning and J. G. Murray

[57] ABSTRACT

A technique of using the time between the direct path and the reflected path of an IFF interrogation to inhibit responses to succeeding reflected path interrogations.

5 Claims, 3 Drawing Figures

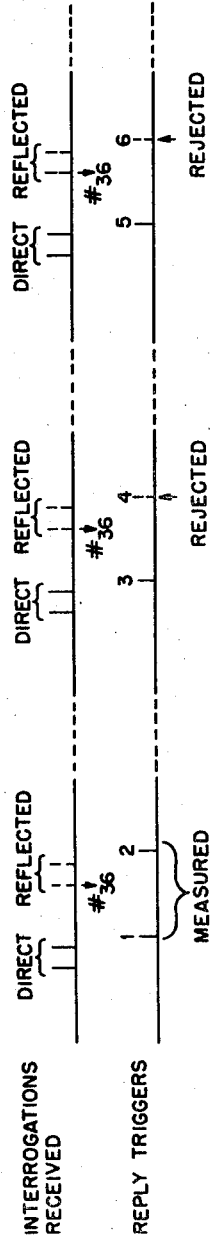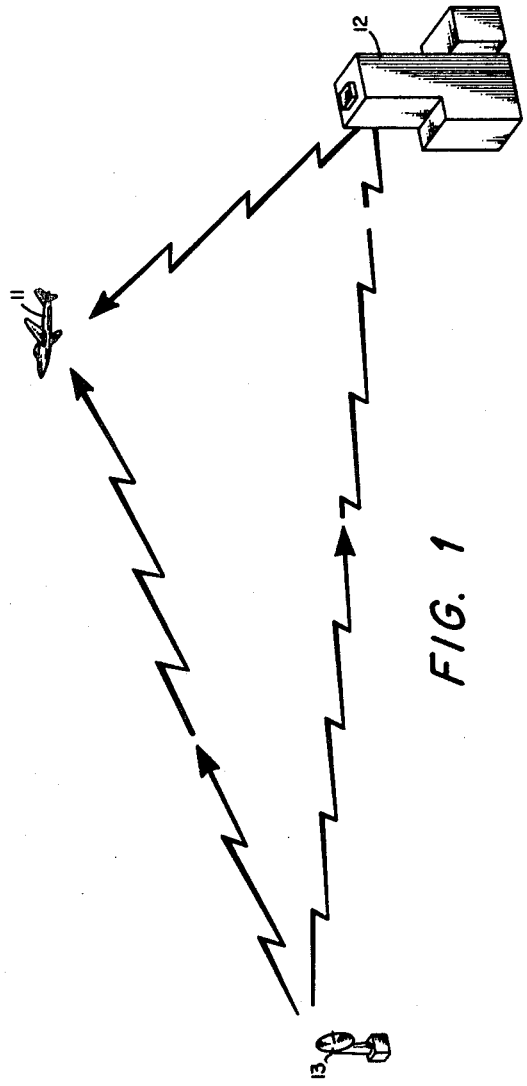

REFLECTED IFF INTERROGATION REJECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a suppression network for use in a transponder receiving interrogation signals.

An interrogation transmitter system, when utilized with a transponder, transmits a coded signal consisting of a train of timewise spaced pulses. The coded signal generated by the interrogation system is received by the transponder and analyzed. If the pulses are of the correct frequency, amplitude and spacing, an output signal will be produced by the transponder. The interrogation system may, for example, be positioned on the ground while the transponder may be mounted in an aircraft and be utilized for identification purposes or for deriving other information such as altitude or bearing of the aircraft.

Since the transponder is triggered, or caused to transmit a reply, in response to interrogation coded signals, care must be taken to prevent false, or spurious triggering of the transponder. Such undesired triggering of the transponder is usually caused by a coded pulse train signal from a side lobe of the radiating antenna of the interrogation system. Another cause for undesired triggering has been known to occur due to echoes or reflected signals.

Current interrogation friend or foe (IFF) transponders include a suppression network to prevent triggering of the transponder due to reflected signals. The suppression period, usually 75 to 125 microseconds, that follows each reception of an interrogation causes the transponder to reject all interrogations during that period when actually, only the reflected signals should be rejected.

Since all interrogations on any particular mode are essentially identical, regardless of their source or time of occurrence, it is not possible to code them so that a reflected signal can be recognized as being the same as the one just previously received.

It has long been recognized that the use of long suppression periods to overcome reflections is wasteful, since it denies utilization of the transponder to other direct path interrogations that may arrive from other interrogators during the suppression period, but no satisfactory alternative could be found.

SUMMARY OF THE INVENTION

The general purpose of this invention is to provide an improved suppression network to be used in an IFF system. The time between two identical interrogations that arrive in any 75-125 μsec. interval is measured and stored. Digital circuitry is used to inhibit responses to 2nd, 3rd, 4th...nth interrogations reflected from any object separated in time from a previous interrogation by the same stored time interval.

OBJECTS OF THE INVENTION

It is therefore an object of the present invention to provide a transponder having an improved suppression network.

Another object of the present invention is to provide a transponder capable of recognizing reflected signals.

A further object of the present invention is to provide a transponder operable without long suppression periods.

A still further object of the present invention is to provide an IFF transponder capable of responding to more valid interrogations.

Yet another object of the present invention is to increase the traffic capacity and reliability of current IFF systems.

A still further object of the present invention is to provide a way to prevent reflected IFF interrogations from eliciting responses from transponders without turning the transponders off for more than a few microseconds at a time.

Other objects, advantages and novel features of the invention will become apparent from the following detailed description of the invention when considered in conjunction with the accompanying drawings wherein:

BRIEF DESCRIPTION OF THE DRAWING

FIG. 1 is a pictorial representation of the way in which IFF interrogations produce undesired transponder triggering.

FIG. 2 is a time plot of interrogation and reply signals in the transponder.

DESCRIPTION OF THE PREFERRED EMBODIMENT

Figure 3:
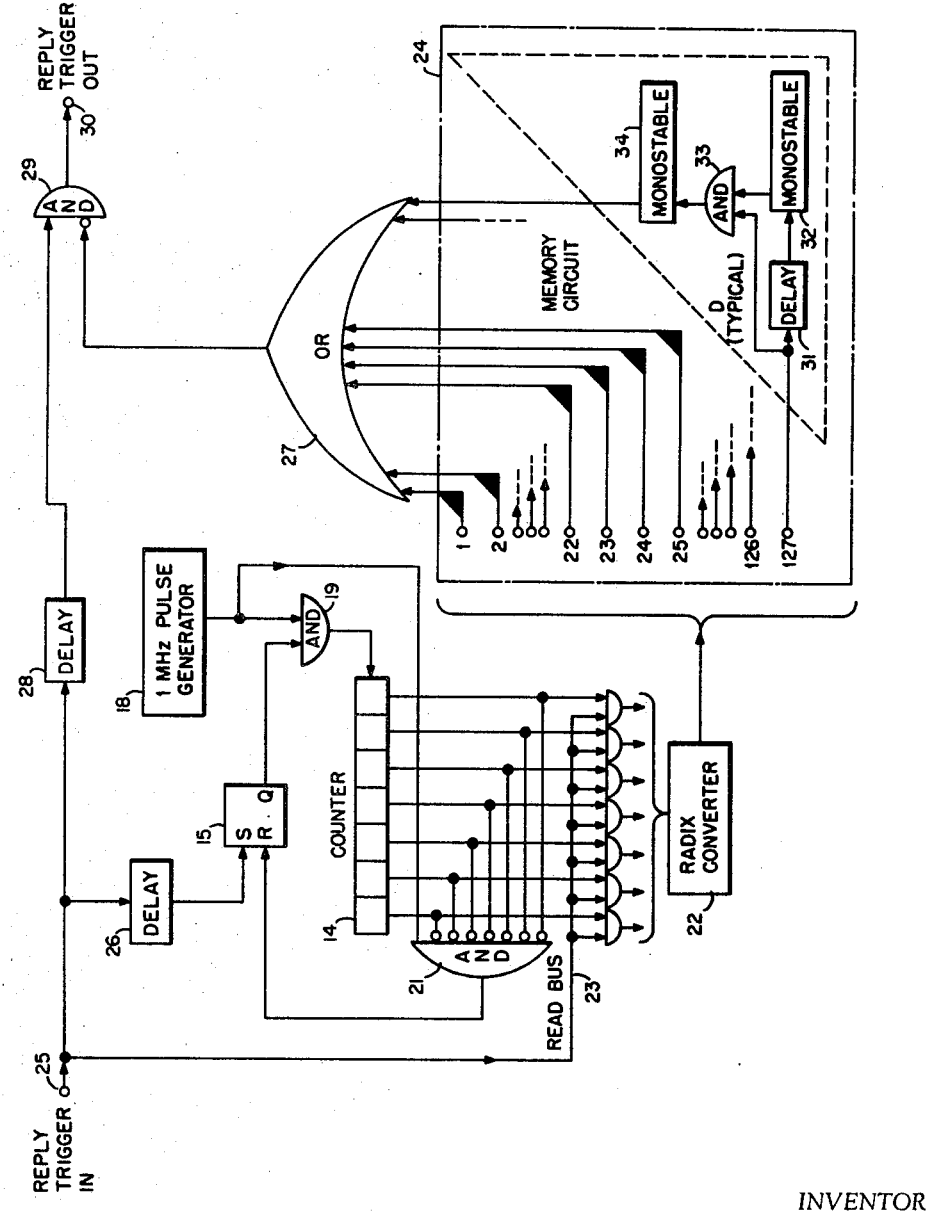
FIG. 3 is a block diagram of the suppression network for reflected IFF interrogations.

FIG. 1 shows the way in which SIF-type (two pulse) IFF interrogations from antenna 13 may produce undesired aircraft 11 transponder reply triggering. Current transponders (the AN/APX-72 for example) are designed so that the transponder decoder is suppressed for some 90 microseconds (μsec.) each time an interrogation is received. This suppression serves to deny a response to any interrogation arriving via a reflected path, such as from object 12, but it also denies responses to other direct-path interrogations that may arrive from other interrogators during this time interval.

FIG. 2 shows how interrogations and reply triggers will appear at a transponder where the reflected-path interrogations are subjected to a 36 microsecond delay, where reply trigger No. 1 is due to the arrival of a direct path interrogation, and No. 2 is due to the arrival of its reflected path counterpart. The delay between triggers No. 1 and No. 2 can be measured and "numbered" in microseconds (36 in the case illustrated). Succeeding reflected interrogations that occur the same length of time after direct-path interrogations can then be "rejected" by preventing their reply triggers from reaching the transponder's transmitter. (e.g., reply triggers No. 4 and No. 6 in FIG. 2).

FIG. 3 shows a simple circuit that can accomplish the reflected IFF interrogation rejection illustrated in FIG. 2.

The counter 14 is normally in the "all-zero" setting; the switch 15 is thus normally in the reset position so that there is no output on lead Q. Hence, although the 1 MHz pulse generator 19 is operating continuously, none of its pulses can pass through AND-circuit 19 until switch 15 is set. AND-circuit 21 is so connected that it will cause switch 15 to be reset each time the counter 14 reaches the "all-zero" state. The radix converter 22 accepts a binary number from the counter 14 each time the read bus 23 is activated and produces a pulse on the leads 1 to 127 in the memory circuit 24 that corresponds to this binary number. Note that the memory circuit 24 "remembers" which leads have been activated during a period equal to the average scan time, i.e., the average time that an interrogator antenna is beamed toward a transponder.

The operation of the circuit shown in FIG. 3 will now be described in reference to FIG. 2 signals appearing at IN-terminal 25. Reply trigger No. 1 will immediately cause the state of the counter 14 to be read into the radix converter 22. However, since the counter 14 is normally in the "all-zero" state, and there is no "0" terminal at the output of the radix converter 22, "reading" the counter at this time will produce no results. Reply trigger No. 1 will be delayed very slightly by delay 26 and then it will set switch 15, thus producing a continuous output on lead Q and providing one input to AND-circuit 19. Pulses from the continuously running 1 MHz pulse generator 18 will then start entering the seven-stage binary counter 14 at the rate of one pulse per microsecond. The 1 MHz rate is used for illustration only as other rates could be utilized just as well. Since there is no output from the OR-circuit 27, reply trigger No. 1 will pass directly through delay 28 and AND-circuit 29 to the OUT-terminal 30. The delay 28 must only be long enough to permit sensing the status of the jector circuit. It should not be greater than 0.5 microsecond. The other delays, 26 and 31, should be still smaller than delay 3.

Reply trigger No. 2, the first trigger resulting from a reflected-path interrogation, occurs 36 microseconds after reply trigger No. 1. It will thus find the counter 14 on binary 0100100. This number, when "read" through the radix converter 22, will become No. 36, and lead No. 36 into the memory circuit 24 will receive a pulse. This pulse will enter the D-circuit of lead No. 36 (See typical example shown on lead No. 127), and after a slight delay caused by delay 31, it will activate the monostable switch 32. Switch 32 will remain activated and thus provide one input to AND-circuit 33 for the duration of an average scan. However, there will be no input to OR-circuit 27 until a second pulse enters the same D-circuit. Long before reply trigger NO. 3 (of FIG. 2) occurs, the counter 14 will have reached the "all-zero" state and hence will have caused switch 15 to be reset. Reply trigger No. 3 will thus accomplish exactly the same thing as reply trigger No. 1—it will allow the counter 14 to start counting pulses from the pulse generator 18, and it will produce a reply trigger on the OUT-terminal 30.

When reply trigger No. 4 arrives (36 microseconds after reply trigger No. 3) it will find the counter 14 in state 0100100 just as reply trigger No. 2 did; so lead No. 36 to the memory circuit 24 will again receive a pulse. This pulse will pass directly through the D-circuit of lead No. 36, for monostable switch 32 will still be providing one input to AND 33. The monostable switch 34 serves to lengthen the pulse that comes out of the D-circuit so that, after passing through the OR-circuit 27, it will inhibit AND-circuit 29 and thus prevent reply trigger No. 4 from producing an output at the OUT-terminal 30.

In like manner, reply trigger No. 5 will produce a reply trigger at the OUT-terminal 30 and reply trigger No. 6 will not, since these triggers have exactly the same time relationship as reply triggers No. 3 and No. 4. All succeeding pairs of reply triggers separated by 36 microseconds will do the same, i.e., the reply trigger resulting from a direct-path interrogation will produce a reply trigger on the OUT-terminal 30 and the one resulting from a reflected-path interrogation will not.

Only one reflected IFF interrogation rejector circuit is needed in a transponder, for the operations described above can be performed simultaneously for other pairs of reply triggers separated by any length of time up to the capacity of the counter 14 (127 microseconds in the example illustrated).

In current transponders, the first 21 leads and the corresponding D-circuits may be omitted, because all transponders are automatically suppressed while the reply of approximately 21 microseconds is being transmitted. Whether the leads numbered 91 through 127 are needed or not is open to question, since leads 22 through 90 would provide antireflection protection equal to that which is now being provided.

The use of this reflected IFF interrogation reflector would permit transponders to answer many valid interrogations that now fail to be answered, because of the long suppression periods. This would serve to increase the number of interrogators that could use the IFF system simultaneously without experiencing mutual interference and would automatically increase the system's reliability and antijam capability. The fact that transponder transmitter duty cycles might be increased momentarily should not be a problem, since the automatic overload control (AOC) circuit protects the transmitters from overloading. Very few valid interrogations would be rejected by the one microsecond suppression intervals, associated with reflected interrogations, in the memory circuits.

It is quite likely that a number of simplifications are feasible. It might be possible, for example, to reduce the counting rate of the counter and thus reduce the number of D-circuits required. Good systems engineering and circuit design should provide a number of other simplifications. It is believed, however, that this approach of suppressing only the reflections that actually reach a transponder offers the possibility of considerable improvement in transponder operation. The same approach should be applicable to certain other electronic systems that provide navigation and/or communications information.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. In a transponder receiving IFF interrogation signals and emitting reply signals, a suppression network for suppressing reply signals for reflected interrogation signals comprising:
   means for determining the time interval between said reflected interrogation signal and a direct interrogation signal;
   storage means for storing said determined time interval; and
   means for suppressing ensuing transponder reply signals time separated from a reply signal for a previous interrogation by said stored time interval.

2. A suppression network as recited in claim 1, wherein means are included to reset said switch when said counter reaches a means, a free running pulse generator and a switch, wherein a first reply signal sets the switch to produce a continuous output to one input of said coincidence means, the other input of said coincidence means being supplied by said pulse generator, the output signal of said coincidence means initiating said counter, a second reply signal transferring the count in said counter at that instant into said storage means.

3. A suppression network as recited in claim 2 wherein said counter resets said switch upon reaching a predetermined count whereby there is no output signal by said coincidence means.

4. A suppression network as recited in claim 3 wherein said suppressing means comprises:
   means for delaying each reply signal; and
   coincidence means for receiving said delayed reply signal and an indicating signal from said stored means, said coincidence means suppressing a reply signal if said indicating signal indicates that said reply signal is separated from a reply signal for a previous interrogation by a determined time interval stored in said storage means.

5. A suppression network as recited in claim 4 wherein said storage means comprises:
   delay means for delaying a first count signal a predetermined time;
   coincidence means for receiving said delayed count signal and an ensuing identical count signal, said coincidence means output suppressing said coincidence means receiving said delayed reply signal.

* * * * *